US012803776B2

(12) United States Patent
Kundu et al.

(10) Patent No.: US 12,803,776 B2
(45) Date of Patent: Nov. 17, 2026

(54) DETERMINISTIC JITTER DETECTION AND MITIGATION FOR FREQUENCY DIVIDER CIRCUITRY

(71) Applicant: XILINX, INC., San Jose, CA (US)

(72) Inventors: Somnath Kundu, Hillsboro, OR (US); Hsung Jai Im, San Jose, CA (US); Hongtao Zhang, San Jose, CA (US); Yanfei Chen, Cupertino, CA (US); Ankur Jain, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 44 days.

(21) Appl. No.: 18/951,394

(22) Filed: Nov. 18, 2024

(65) Prior Publication Data

US 2026/0142792 A1 May 21, 2026

(51) Int. Cl.
*H04L 7/00* (2006.01)

(52) U.S. Cl.
CPC ............ *H04L 7/0033* (2013.01); *H04L 7/007* (2013.01)

(58) Field of Classification Search
CPC .............................. H04L 7/0033; H04L 7/007
See application file for complete search history.

(56) References Cited

U.S. PATENT DOCUMENTS 5,552,732 A 9/1996 Huang
6,720,810 B1 * 4/2004 New ...................... H03K 5/135 327/158
6,882,229 B1 4/2005 Ho et al.
10,630,272 B1 * 4/2020 Ashtiani .................. H03K 5/12
2009/0146708 A1 * 6/2009 Yun ........................... H03L 7/07 327/158
2016/0105165 A1 * 4/2016 Shim .................... H03K 5/1565 327/175
2023/0113204 A1 * 4/2023 Lee ........................ G11C 7/222 365/233.1

OTHER PUBLICATIONS

Alfke, Peter "Unusual Clock Dividers," Xcell, Issue 33, 3rd Quarter, 1999, pp. 30-31.

* cited by examiner

*Primary Examiner* — David S Huang
(74) *Attorney, Agent, or Firm* — Patterson + Sheridan, LLP

(57) ABSTRACT

A communication system includes correction circuitry. The correction circuitry includes detection circuitry and clock correction circuitry. The detection circuitry determines a first correction value based on a first rising edge and a second rising edge of a divided clock signal. The clock correction circuitry receives a first clock signal, a second clock signal and the first correction value, and generates a first adjusted clock signal and a second adjusted clock signal based on the first correction value. The first clock signal and the second clock signal. The first adjusted clock signal and the second adjusted clock signal are used by divider circuitry to generate the divided clock signal. A frequency of the divided clock signal is less than a frequency of the first clock signal and the second clock signal.

20 Claims, 9 Drawing Sheets

DETERMINISTIC JITTER DETECTION AND MITIGATION FOR FREQUENCY DIVIDER CIRCUITRY

TECHNICAL FIELD

Examples of the present disclosure generally relate to detecting and mitigating jitter in the output of a frequency divider circuitry.

BACKGROUND

A communication system may be transceiver circuitry that includes transmitter circuitry and receiver circuitry that are connected to each other via a channel. The transceiver circuitry may be part of serial/deserializer (SerDes) circuitry. The receiver circuitry, and/or the transmitter circuitry, may include clock and data recover (CDR) circuitry. The CDR circuitry creates a clock signal that is aligned to the phase and/or the frequency of a received signal or transmitted signal. The transceiver circuitry further includes frequency divider circuitry. The frequency divider circuitry allows for the generation multiple clock signals having unrelated frequencies. The frequency divider circuitry can be an integer or fractional divider circuitry. The frequency divider circuitry converts a higher frequency signal to a lower frequency, by dividing the frequency of the higher frequency signal down.

However, fractional division (e.g., 1.5 frequency divider circuitry) generates a clock signal by combining rise and fall edges of the input clock that includes increased duty cycle error and/or jitter due to path delay mismatch and duty cycle error in the input clock signals.

SUMMARY

In one example, a correction circuitry includes detection circuitry and clock correction circuitry. The detection circuitry determines a first correction value based on a first rising edge and a second rising edge of a divided clock signal. The clock correction circuitry receives a first clock signal, a second clock signal and the first correction value, and generates a first adjusted clock signal and a second adjusted clock signal based on the first correction value. The first clock signal and the second clock signal. The first adjusted clock signal and the second adjusted clock signal are used by divider circuitry to generate the divided clock signal. A frequency of the divided clock signal is less than a frequency of the first clock signal and the second clock signal.

In one example, a method includes determining a first correction value based on a first rising edge and a second rising edge of a divided clock signal. The method further includes generating a first adjusted clock signal and a second adjusted clock signal based on the first correction value, a first clock signal, and a second clock signal. The first adjusted clock signal and the second adjusted clock signal are used by divider circuitry to generate the divided clock signal. A frequency of the divided clock signal is less than a frequency of the first clock signal and the second clock signal.

In one example, a communication system includes transceiver circuitry connecting a first integrated circuit (IC) device with a second IC device. The transceiver circuitry includes detection circuitry, clock correction circuitry, and clock divider circuitry. The detection circuitry determines a first correction value based on a first rising edge and a second rising edge of a divided clock signal. The clock correction circuitry receives a first clock signal, a second clock signal and the first correction value, and generates a first adjusted clock signal and a second adjusted clock signal based on the first correction value, the first clock signal and the second clock signal. The clock divider circuitry generates the divided clock signal from the first adjusted clock signal and the second adjusted clock signal. A frequency of the divided clock signal is less than a frequency of the first clock signal and the second clock signal.

BRIEF DESCRIPTION OF DRAWINGS

So that the manner in which the above-recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1A:
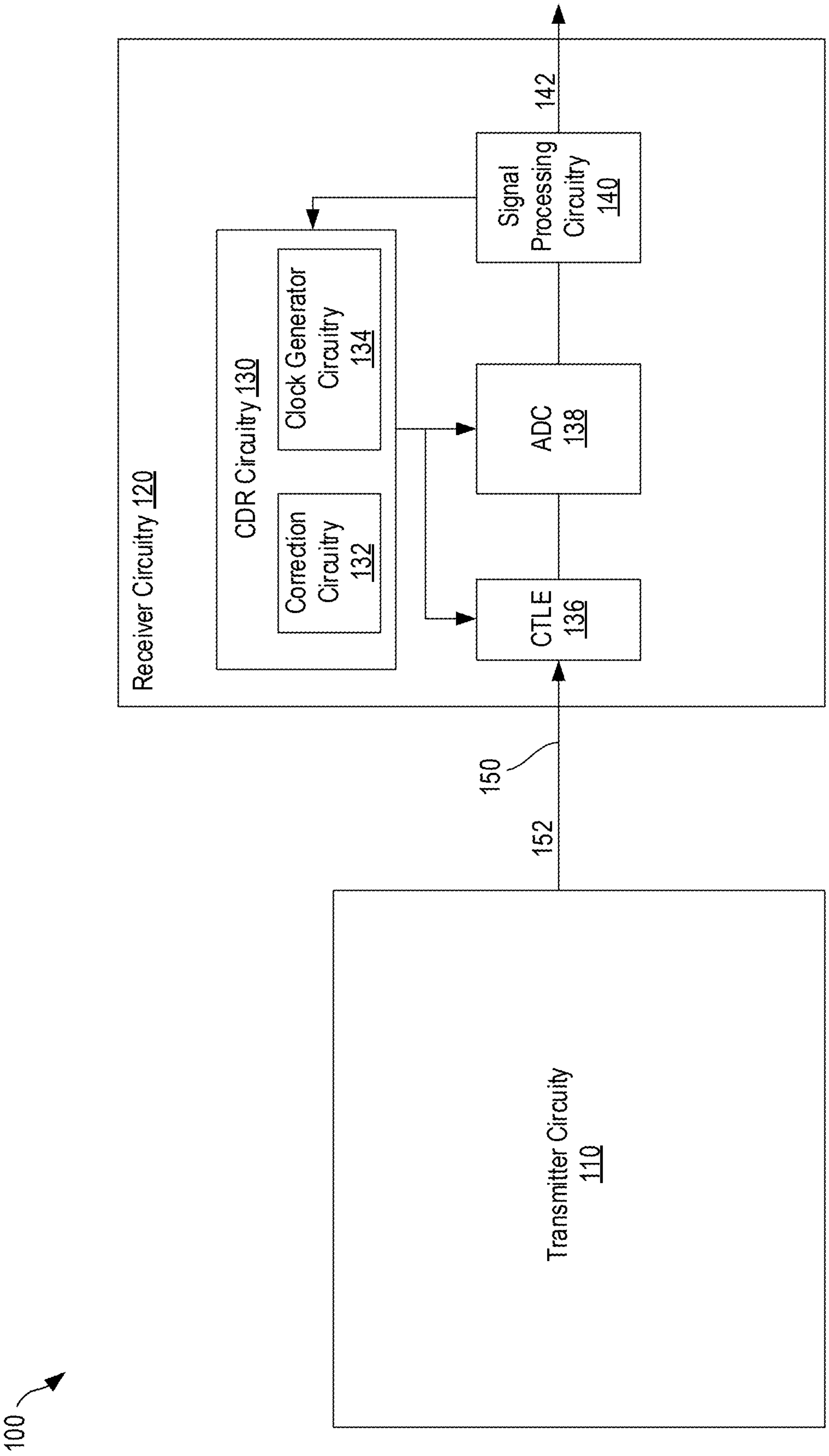
FIG. 1A illustrates a block diagram of a communication system.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Communication systems may be used in the communication between multiple integrated circuit (IC) devices and/or between elements of an IC device. A communication may be used to transmit high-speed data between IC devices. The IC devices may include processing devices and memory devices, among others. The communication may be between processing devices, between memory devices, or between a processing device and a memory device. A processing device may be a central processing unit (CPU) or a graphics processing unit (GPU), among others. In other examples, a processing device is a field programmable gate array (FPGA) or an application specific IC (ASIC).

A communication system includes transceiver circuitry. The transceiver circuitry includes transmitter circuitry and receiver circuitry. The transmitter circuitry and the receiver circuitry are connected to each other via one or more channels, and are used to communicate data between the corresponding IC devices.

A communication system may be a serial/deserializer (SerDes) system. A SerDes system converts data between parallel and serial data during the transmission of the data. For example, parallel data is serialized by transmitter circuitry and transmitted serially to receiver circuitry, which deserializes the serial data into parallel data for further processing.

A communication system may include frequency divider circuitry. The frequency divider circuitry allows for the generation multiple clock signals having unrelated frequencies. The frequency divider circuitry can be an integer or fractional divider circuitry. The frequency divider circuitry converts a higher frequency signal to a lower frequency, by dividing the frequency of the higher frequency signal down.

A communication system further includes clock and data recovery (CDR) circuitry. CDR circuitry creates a clock signal that is aligned to the phase and/or the frequency of a received signal or transmitted signal.

In some instances, integer frequency divider circuitry (e.g., a minimum integer factor of 2) is associated with an octave tuning range that is used for the clock generation circuitry (e.g., voltage-controlled oscillator (VCO) in a phase-locked loop or other types of clock generation circuitry). For an inductive capacitive based VCO (LC-VCO), or other types of VCOs or clock generation circuitries, achieving such a large tuning range is challenging.

The use of a 1.5 frequency divider circuitry reduces the tuning range requirement to 1.5×, simplifying the clock generation circuitry design and of the corresponding communication system. However, a 1.5 frequency divider circuitry can generate deterministic jitter (DJ) in the output clock signals, introducing noise within the clock signals. In the following, improved clock jitter detection and mitigation circuitry is described that detects the deterministic jitter and mitigates the effects of the deterministic jitter. Detecting and mitigating the effects of deterministic jitter allows for 1.5 frequency divider circuitry to be used in an increased number of communication systems, simplifying the design of a communication system, decreasing the design time and corresponding manufacturing cost of a corresponding semiconductor computing device.

FIG. 1A illustrates a block diagram of a communication system 100, according to one or more examples. The communication system 100 includes transmitter circuitry 110 and receiver circuitry 120 communicatively connected to each other via channel 150. In one example, the transmitter circuitry 110 and the receiver circuitry 120 is part of a transceiver device. In one example, the communication system 100 is a SerDes communication system. The communication system 100 is included within one or more IC devices. For example, the transmitter circuitry 110 is included within a first IC device and the receiver circuitry 120 is included in a second IC device. In another example, at least a portion of the transmitter circuitry 110 and at least a portion of the receiver circuitry 120 are included within a common IC device.

The transmitter circuitry 110 communicates (e.g., transmits) data signals 152 to the receiver circuitry 120 via the channel 150. The data signal 152 may be a serial data signal. The data signal 152 includes one or more symbols. The transmitter circuitry 110 converts each symbol into a voltage which is driven onto the channel 150 and received by the receiver circuitry 120. The transmitter circuitry 110 uses one or more modulation schemes (e.g., a binary non-return-to-zero modulation scheme or a multi-level digital baseband modulation scheme, among others). Further, the transmitter circuitry 110 drives the data signal 152 based on a transmitter clock signal. The transmitter clock signal may be generated locally within the transmitter by clock generation circuitry (e.g., phase-locked loop (PLL) circuitry or other clock generation circuitry).

The receiver circuitry 120 receives the data signals 152 from the transmitter circuitry 110 via the channel 150. In one or more examples, the receiver circuitry 120 includes CDR circuitry 130 that generates a clock signal based on the transmission rate of the data signal 152, and accordingly, the clock signal of the transmitter circuitry 110. In one or more examples, the CDR circuitry 130 adjusts the phase of the clock signal based on the data signal 152. The CDR circuitry 130 includes correction circuitry 132 and clock generator circuitry 134. The clock generator circuitry 134 generates one or more clock signals based on the data signal 152. The CDR circuitry 130 detects deterministic jitter, and other interference, within the clock signals and mitigates the deterministic jitter, and other interference, within the clock signals.

The receiver circuitry 120 further includes continuous time linear equalization (CTLE) circuitry 136, and/or other equalization circuitry, analog-to-digital converter (ADC) circuitry 138, and signal processing circuitry 140. The CTLE circuitry 136 performs an equalization process on received data signals based on the clock signal output by the CDR circuitry. The equalization process includes restoring the amplitude distortions that occur within the data signal transmitted by the transmitter circuitry 110 via the channel 150. The ADC circuitry 138 is connected to the output of the CTLE circuitry 136, receives the signal output of the CTLE circuitry 136, and converts the signal from an analog domain to a digital domain based on a clock signal output by the CDR circuitry 130.

Signal processing circuitry 140 is connected to the output of the ADC circuitry 138, and performs one or more signal processing process (e.g., mathematical operations) on the digital signal output by the ADC circuitry 138. The signal processing circuitry 140 outputs the processed signal as the signal 142.

Figure 1B:
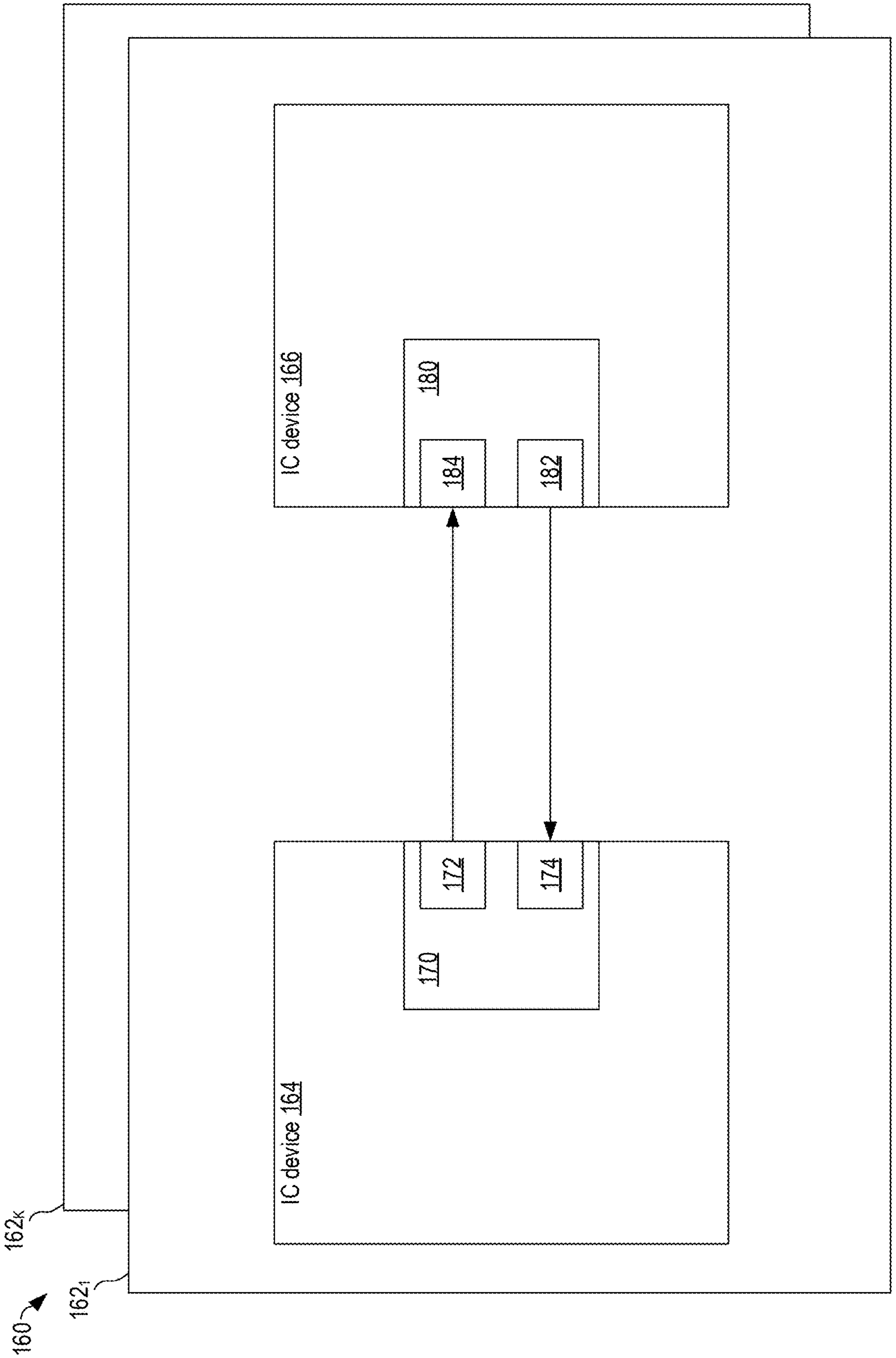
FIG. 1B illustrates a block diagram of a computer system.

FIG. 1B illustrates a block diagram of a computer system 160. The computer system 160 includes computer devices $\mathbf{162}_1$-$\mathbf{162}_K$. K is one or more. In one example, the computer devices 162 are server computer devices, and are connected together within the computer system 160. In such an example, the computer system 160 is a distributed computer system. The computer devices 162 perform one or more functions of a shared application, or perform different applications.

A computer device 162 includes an IC device 164 and IC device 166. In other example, the computer device 162 may include more than two IC devices that are interconnected. The IC device 164 includes transceiver circuitry 170. The transceiver circuitry 170 includes transmitter circuitry 172 and receiver circuitry 174. The IC device 166 includes transceiver circuitry 180. The transceiver circuitry 180 includes transmitter circuitry 182 and receiver circuitry 184. The transceiver circuitry 170 is connected with the transceiver circuitry 180. In one example, the transmitter circuitry 172 is connected with the receiver circuitry 184. The transmitter circuitry 182 is connected with the receiver circuitry 174.

The transceiver circuitry 170 and/or the transceiver circuitry 180 form at least part of one or more communication systems that are configured similar to the communication system 100 of FIG. 1.

Figure 2:
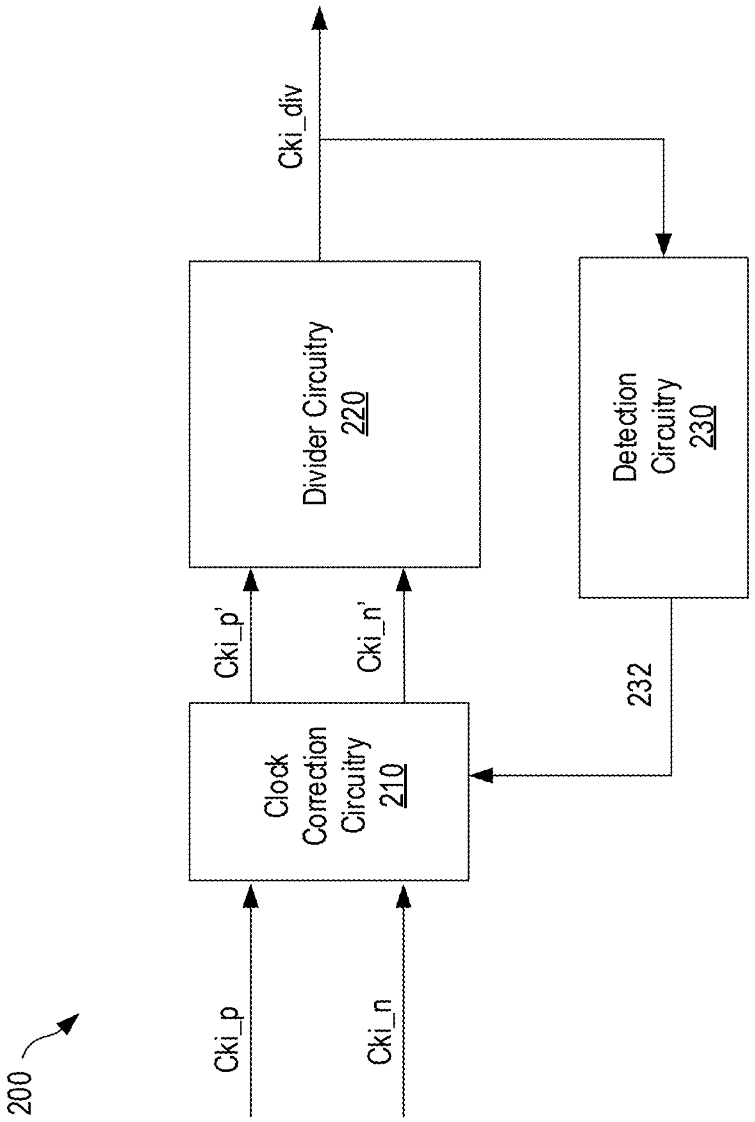
FIG. 2 illustrates a block diagram of clock correction circuitry, divider circuitry, and detection circuitry.

FIG. 2 illustrates a block diagram of clock correction circuitry 210, divider circuitry 220, and detection circuitry 230, according to one or more examples. The clock correction circuitry 210, the divider circuitry 220, and the detection circuitry 230 may be included as part of the CDR circuitry 130 of FIG. 1A. The clock correction circuitry 210 and the detection circuitry 230 may be included as part of the correction circuitry 132 of FIG. 1. The divider circuitry 220 may be included as part of the clock generation circuitry 134. In other examples, the divider circuitry 220 may be included as part of the correction circuitry 132.

The correction circuitry receives the clock signals Cki_p and Cki_n. The clock signal Cki_n is out of phase with the clock signal Cki_p. In one example, the clock signal Cki_n is an inverted version of the clock signal Cki_p.

Figure 3:
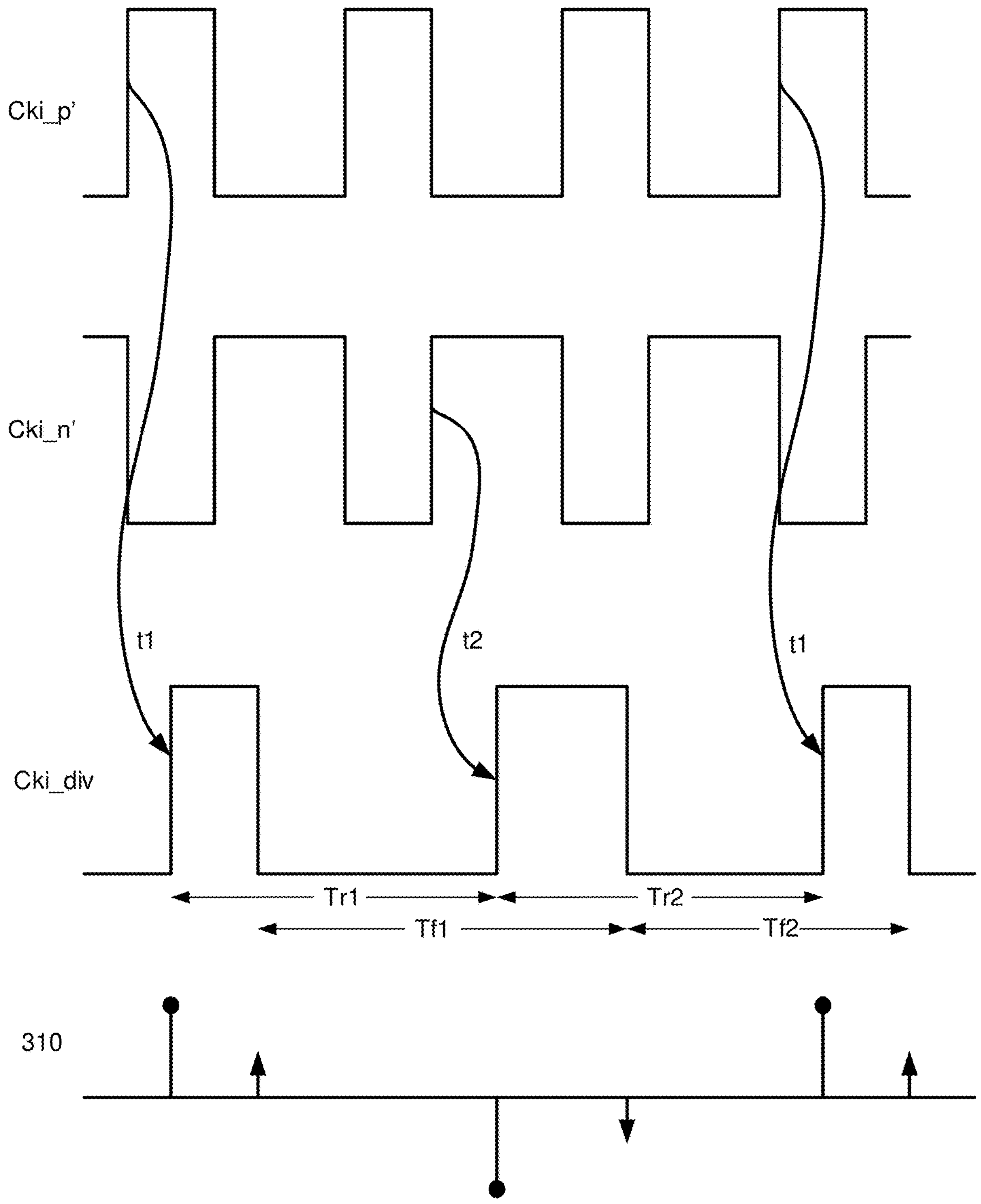
FIG. 3 illustrates waveforms and samples associated with clock signals and a divided clock signal.

The clock correction circuitry 210 adjusts one or more of the clock signals Cki_p and Cki_n based on the signal 232 received from the detection circuitry 230. The clock correction circuitry 210 adjusts the clock signal Cki_p and/or the clock signal Cki_n to generate the clock signals Cki_p' and Cki_n'. The clock signal Cki_p' is generated based on the clock signal Cki_p and any corresponding adjustments, and the clock signal Cki_n' is generated based on the clock signal Cki_n and any corresponding adjustments. In one example, the clock signal Cki_p' is the same as (e.g., a non-adjusted version of) the clock signal Cki_p and/or the clock signal Cki_n' is the same as the clock signal Cki_n. FIG. 3 illustrates example waveforms for the clock signals Cki_p' and Cki_n'.

The divider circuitry 220 is connected to the outputs of the clock correction circuitry 210. The divider circuitry 220 receives the clock signal Cki_p' and Cki_n' from the clock correction circuitry 210. The divider circuitry 220 generates the clock signal Cki_div from the clock signals Cki_p' and Cki_n'. FIG. 3 illustrates an example waveform for the clock signal Cki_div.

The divider circuitry 220 generates the clock signal Ck_div by periodically selecting and outputting a pulse of one of the clock signal Cki_p' or Cki_n'. The divider circuitry 220 detects (e.g., determines) a rising edge and pulse of the clock signal Cki_p', and generates a corresponding rising edge and first pulse of the clock signal Ck_div. The rising edge of the clock signal Cki_p' and corresponding rising edge of the clock signal Ck_div are indicated by t1 in FIG. 3. The divider circuitry 220 detects (e.g., determines) a rising edge and pulse of the clock signal Cki_n', and generates a corresponding rising edge and second pulse of the clock signal Ck_div. The rising edge of the clock signal Cki_n' is a first rising edge of the clock signal Cki_n' that is determined to occur after the falling edge of the clock signal Ck_div. The divider circuitry 220 detects (e.g., determines) a rising edge and pulse of the clock signal Cki_p' that follows (is subsequent to) a falling edge of the second pulse of the clock signal Ck_div, and generates a corresponding rising edge and third pulse of the clock signal Ck_div. The rising edge of the clock signal Cki_n' is a first rising edge of the clock signal Cki_n' that is determined to occur after the falling edge of the clock signal Ck_div.

Errors between the clock signals Cki_p' and Cki_n' may negatively affect the clock signal Ck_div. The error may be due to the duty cycle difference of the clock signal Cki_p' and Cki_n' and/or mismatch between the clock signals Cki_p' and Cki_n'.

The duty cycle of the clock signal Cki_p differs from that of the clock signal Cki_n, accordingly, the clock signal Ck_div includes deterministic jitter. The difference in duty cycle (e.g., duty cycle error) between the clock signals Cki_p and Cki_n is defined as $T2-T1=\varepsilon$. Further, mismatch between (e.g., skew) the clock signals Cki_p' and Cki_n' corresponds to the period between the rising edge of the pulses of the clock signal Ck_div, which is defined as $t2-t1=\Delta$. The deterministic jitter is illustrated in 310 of FIG. 3. The deterministic jitter changes polarity with each cycle of the clock signal Ck_div.

The period Tr1 is the period between the first and second rising edges of the clock signal Ck_div. The period Tr2 is the period between the second and third rising edges of the clock signal Ck_div. The period Tf1 is the period between the first and second falling edges of the clock signal Ck_div. The period Tf2 is the period between the second and third falling edges of the clock signal Ck_div.

The period Tr1 is defined by $2*T1+T2+\Delta$. The period Tr2 is defined by $T1+2*T2-\Delta$. The period Tf1 is defined by $T1+2*T2+\Delta$. The period Tf2 is defined by $2*T1+T2-\Delta$. Using $t2-t1=\Delta$, and $T2-T1=\varepsilon$, the relationship between Tr1 and Tr2 is defined as $Tr1-Tr2=\varepsilon+2*\Delta$, and the relationship between Tf1 and Tf2 is defined as $Tf1-Tf2=-\varepsilon+2*\Delta$.

In one example, to solve and mitigate for both ε and Δ, two cycles of the clock signal Ck_div are used. In one example, the detection circuitry 230 determines the error due to duty cycle (ε) and the error due to mismatch (Δ) based on $Tr1-Tr2=\varepsilon+2*\Delta$ and $Tf1-Tf2=-\varepsilon+2*\Delta$. For example, the detection circuitry 230 uses the digital samples of the clock signal Ck_div to determine Tr1, Tr2, Tf1, and Tf2. Tr1, Tr2, Tf1, and Tf2 are used to determine ε and Δ based on $Tr1-Tr2=\varepsilon+2*\Delta$ and $Tf1-Tf2=-\varepsilon+2*\Delta$. The values for ε and Δ are output to the clock correction circuitry 210. The clock correction circuitry 210 adjusts T1 and/or T2 to mitigate ε and Δ.

Figure 4:
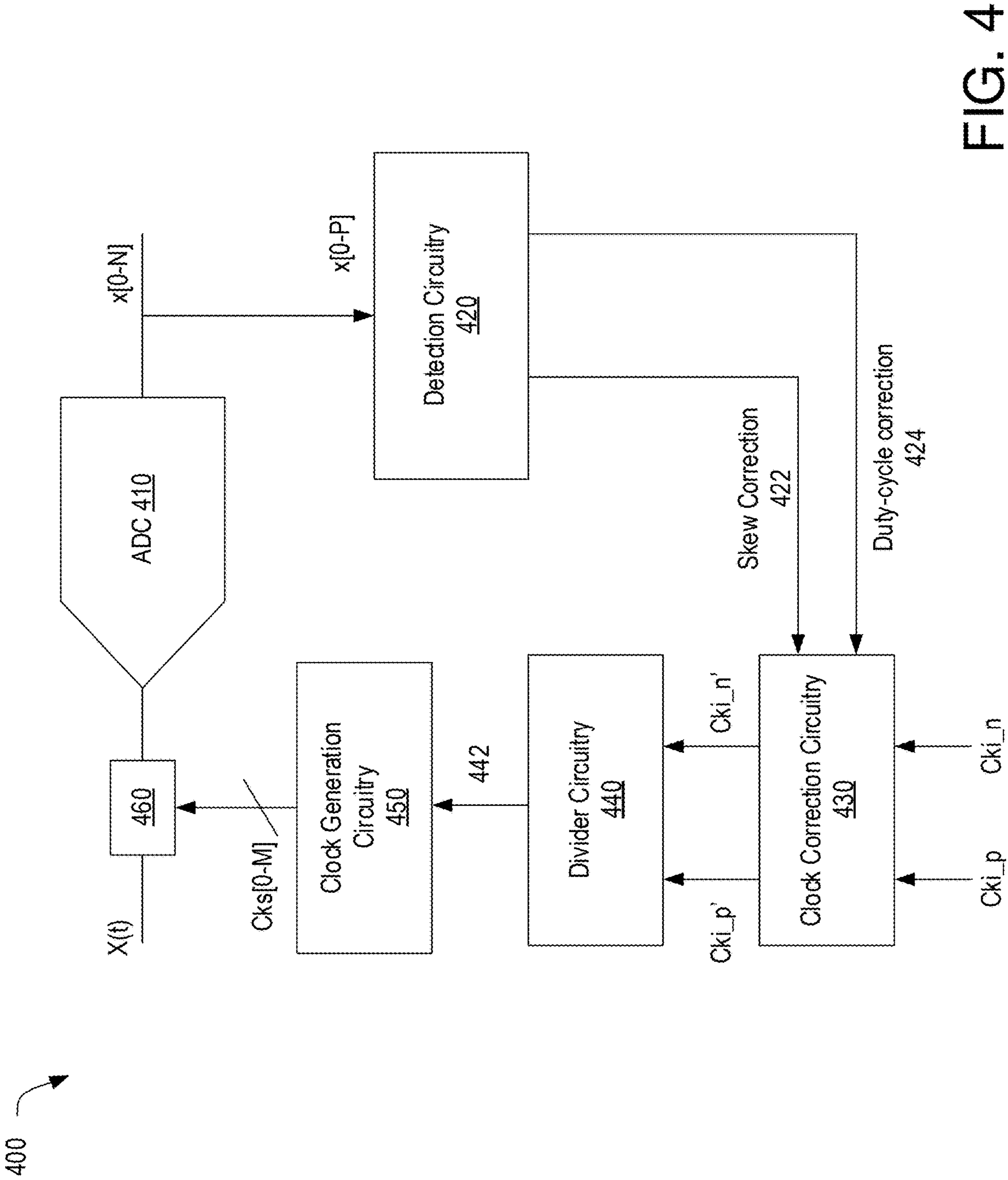
FIG. 4 illustrates a block diagram of an analog-to-digital converter circuitry based receiver circuitry utilized for frequency divider circuitry jitter detection.

FIG. 4 illustrates a block diagram of receiver circuitry 400, according to one or more examples. The receiver circuitry 400 corresponds to the receiver circuitry 120 of FIG. 1A. The receiver circuitry 400 includes ADC circuitry 410, detection circuitry 420, clock correction circuitry 430, divider circuitry 440, clock generation circuitry 450, and switching circuitry 460.

The ADC circuitry 410 corresponds to the ADC circuitry 138 of FIG. 1A. The ADC circuitry 410 receives samples of the signal X(t). The samples are generated by the switching circuitry 460 based on the clock signals Cks[0-M], where M is one or more. In one example, M is 7. The clock signals Cks[0-M] corresponds to M clock signal phases. In one example, the clock signals Cks[0-M] are at 1/Mth baud-rate.

The clock signals Cks[0-M] are generated by the clock generation circuitry 450. The clock generation circuitry 450 corresponds to the clock generation circuitry 134 of FIG. 1A. In one example, the clock generation circuitry 450 is multi-phase clock generation circuitry. For example, the clock generation circuitry 450 includes injection-locked oscillator (ILO) circuitry or a delay-locked loop (DLL) circuitry.

The ADC circuitry 410 outputs a signal include samples x[0-N], where N is one or more. In one example, N is 63. In one example, any errors within the clock signals Cks[0-M] are propagated and generate errors within the samples (e.g., sampled voltages) quantized (e.g., generated) by the ADC circuitry 410 (e.g., the samples x[0-N]). In one example, the input signal X(t) (e.g., input data) is pseudo-random. In such an example, the long-term average of absolute difference between two quantized samples (i.e., |x[i]−x[i+1]|) is proportional to the time between the corresponding sampling instances, which can be sued to mitigate skew in the clock signals Cks[0-M].

The detection circuitry 420 is connected to the output of the ADC circuitry 410 and receives one or more samples x[0-N] from the ADC circuitry 410. The detection circuitry determines the values for duty cycle correction value 424 and skew correction value 422 from the samples x[0-N]. The values for skew correction value 422 and duty cycle correction value 424 are determined from |x[i]−x[i+1]|.

Figure 5:
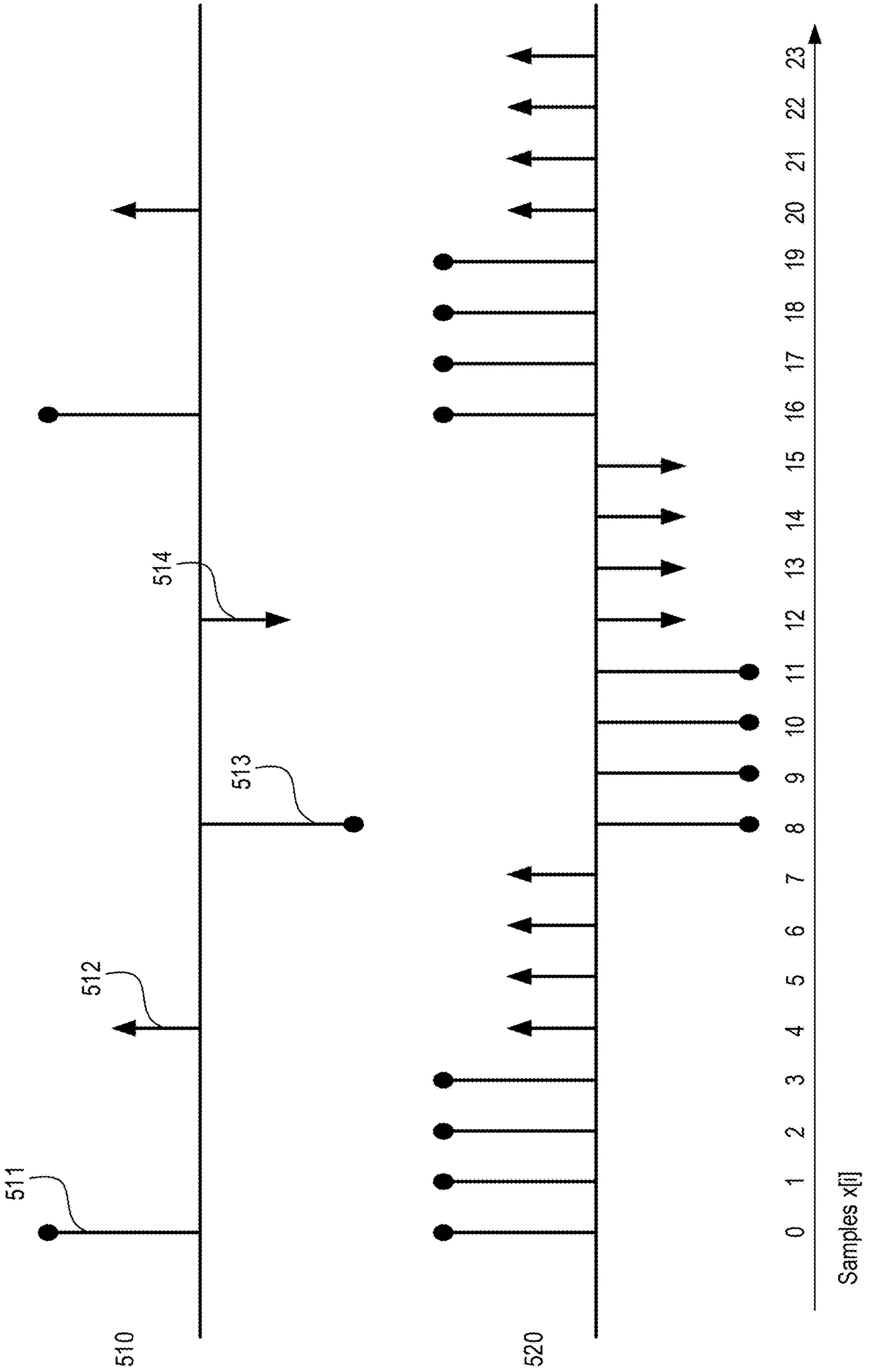
FIG. 5 illustrates a timing diagram of digital samples of a divided clock signals and the output of an analog-to-digital converter.

FIG. 5 illustrates samples 510 and 520. The samples 510 corresponds to the deterministic jitter of the clock signal 442 and the samples x[0-N] that is associated with the divider circuitry 440 The samples 520 correspond to the deterministic jitter of the digital signal output by the ADC circuitry 410 and x[0-N] that is associated with the clock signals Cks[0-M]. In one example, the difference in values of two or more of the samples 520 is used to determine a skew correction value 422 and a duty cycle correction value 424.

With further reference to FIG. 4, the output of the divider circuitry 440 drives the clock generation circuitry 450, such that the M phases of the clock signals Cks[0-M] are generated based on the output (e.g., output clock signal) of the divider circuitry 440. Accordingly, jitter within the output of the divider circuitry 440 propagates to the multiple phases of the clock signals Cks[0-M] (e.g., multi-phase clock signals). In one example, error associated with duty cycle can be determined by comparing the difference between the values of two samples associated with a positive polarity and the difference between the values of two samples associated with the negative polarity. For example, samples x[0-7] are associated with a positive polarity, and samples x[8-15] are associated with a negative polarity. A difference between two samples of x[0-7] is compared to a difference between two samples of x[11-15]. In one example, the two samples are selected such that one sample is associated with a rising edge of the clock signal 442 (e.g., the sample 511 of the samples 510) and one sample is associated with a falling edge of the clock signal 442 (e.g., the sample 512 of the samples 510). In one example, a last sample associated with a rising edge of the clock signal 442 is selected and a first sample associated with a falling edge of the clock signal 442 is selected. A difference between the selected samples is determined. Further, two samples associated with the opposite polarity (e.g., the negative polarity) are selected and difference between the selected samples is determined. In one example, the two samples are selected such that one sample is associated with a rising edge and a negative polarity of the clock signal 442 (e.g., the sample 513 of the samples 510) and one sample is associated with a falling edge and a negative polarity of the clock signal 442 (e.g., the sample 514 of the samples 510). In one example, a last sample associated with a rising edge and a negative polarity of the clock signal 442 is selected and a first sample associated with a falling edge and a negative polarity of the clock signal 442 is selected. A difference between the selected samples is determined. The differences are compared with each other to determine error associated with duty cycle.

In one example, the deterministic jitter between the samples x[3] and x[4] is determined and the deterministic jitter between the samples x[11] and x[12] is determined. In one example, a positive duty cycle value is determined based on the magnitude of the difference between samples x[3] and x[4] (e.g., |x[3]-x[4]|). A negative duty cycle value is determined based on the magnitude of the difference between samples x[11] and x[12] (e.g., |x[11]-x[12]|). To determine the error associated duty cycle (e.g., duty-cycle (ε) correction value 424), the positive and negative duty cycle values are compared. In one examples, the difference between the positive and negative duty cycle values is determined (e.g., |x[3]-x[4]|-|x[11]-x[12]|). In one or more examples, the samples that are similarly affected by deterministic jitter are selected and used for mitigation of the deterministic jitter. For example, as is illustrated in FIG. 5, deterministic jitter introduce by the sample 511 affects the samples x[0]-x[3] similarly. Deterministic jitter introduced by the sample 512 affects the samples x[4]-x[7] similarly. Accordingly, the difference between samples x[3] and x[4] (e.g., x[3]-x[4]) corresponds to the difference in deterministic jitter between samples 511 and 512. Similarly, deterministic jitter introduce by the sample 513 affects the samples x[8]-x[11], and deterministic jitter introduced by the sample 514 affects the samples x[12]-x[15]. In one or more examples, the difference between samples x[8] and x[12] (e.g., x[8]-x[12]) corresponds to the difference in deterministic jitter between samples 513 and 514.

In one example, error associated with skew is determined based by comparing a sample of x[0-7] with a sample of x[8-15], and comparing sample of x[8-15] with a sample of x[16-23]. Stated another way, samples associated with falling and rising edges of three (or more) sequential pulses of the clock signal 442 are compared with each other. In one example, the sample x[7] of the samples 520 is compared to the sample x[8] of the samples 520. For example, a magnitude of the difference in values between x[7] and x[8] (e.g., |x[7]-x[8]|) is determined (e.g., a first skew value). Further, the sample x[15] of the samples 520 is compared to the sample x[16] of the samples 520. For example, a magnitude of the difference in values between x[15] and x[16] (e.g., |x[7]-x[8]|) is determined (e.g., a second skew values). The first and second skew values are compared with each other to determine a skew correction value (e.g., skew (Δ) correction value 422).

The skew correction value 422 and the duty cycle correction value 424 are output to the clock correction circuitry 430. The clock correction circuitry 430 receives the clock signals Cki_p and Cki_n. The clock correction circuitry 430 adjusts one or more of the clock signals Cki_p and Cki_n based on the skew correction value 422 and/or the duty cycle correction value 424. For example, the clock correction circuitry 430, may adjust one or more of a duty-cycle, a period, positive pulse duration, and/or a negative pulse duration, among others, of the clock signal Cki_p and/or the clock signal Cki_n to generate the clock signals Cki_p' and Cki_n'. The clock signals Cki_p' and Cki_n' may be an adjusted versions of the clock signals Cki_p and Cki_n, or an unadjusted versions the clock signals Cki_p and Cki_n.

The divider circuitry 440 receives the clock signals Cki_p' and Cki_n', and generates the clock signal 442. The divider circuitry 440 generates the clock signal 442 from the clock signals Cki_p' and Cki_n' similar to as is described above with regard to the divider circuitry 220 and the clock signal Cki_div.

The clock generation circuitry 450 receives the clock signal 442, and generates the clock signal Cks[0-M]. Each of the clock signals Cks[0-M] has a different phase. For example, the phases may be offset from each other by 45 degrees. In other examples, other offset values may be used. In one example, as the clock signals Cks[0-M] are generated from the clock signal 442, any skew and/or duty-cycle errors within the clock signal 442 propagate to one or more of the clock signals Cks[0-M]. Accordingly, determining the skew correction value 422 and duty cycle correction value 424 and adjusting one or more of the clock signals Cki_p and Cki_n based on the skew correction value 422 and duty cycle correction value 424, errors associated with skew and/or duty-cycle in the clock signal 442 are mitigated, improving the performance of the corresponding CDR circuity, and the corresponding receiver circuitry and/or communication system.

Figure 6:
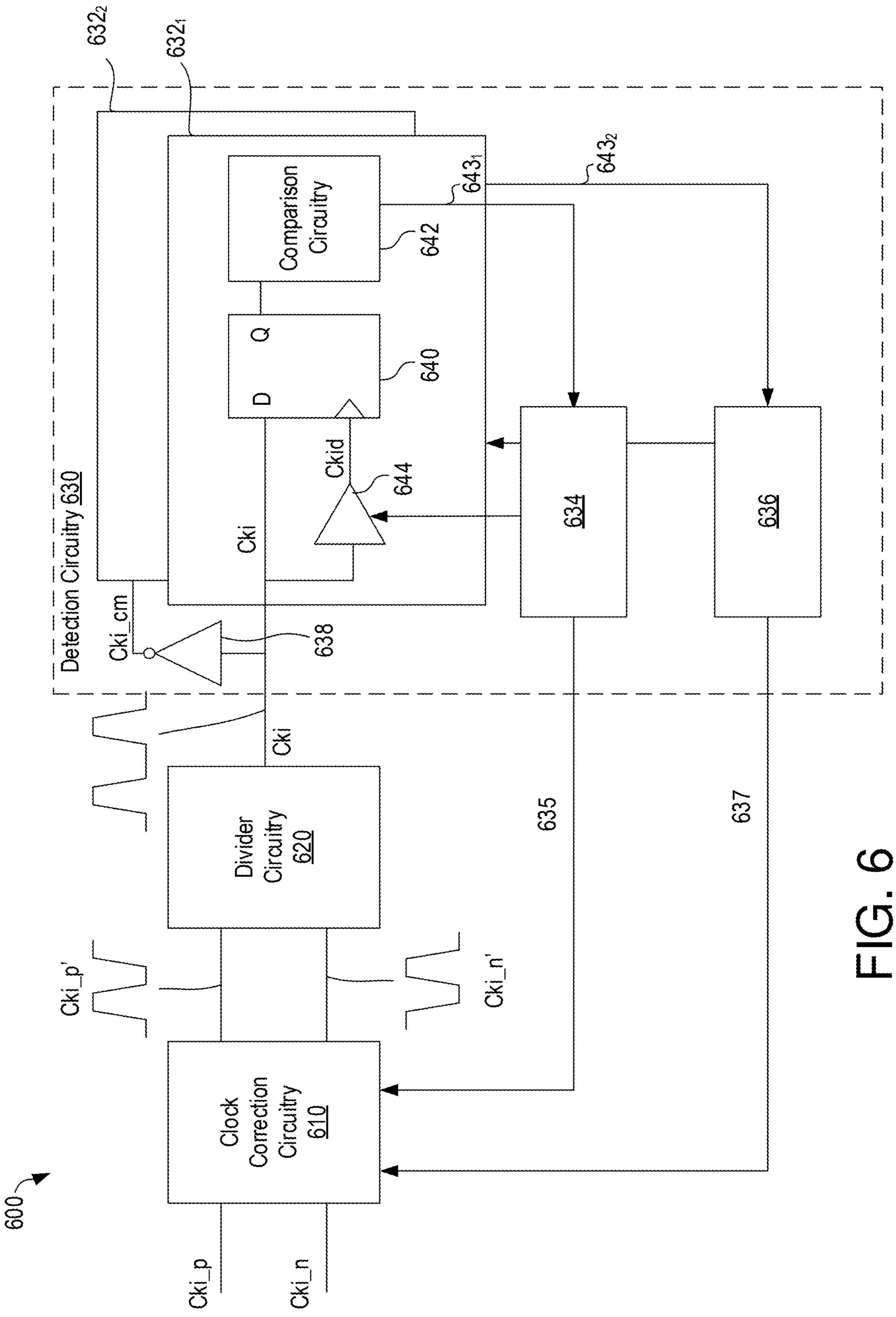
FIG. 6 illustrates a block diagram of clock correction circuitry, divider circuitry, and detection circuitry.

FIG. 6 illustrates a block diagram of clock correction circuitry 610, divider circuitry 620, and detection circuitry 630. In one example, the clock correction circuitry 610 and the detection circuitry 630 form at least part of the correction circuitry 132 of FIG. 1A. The divider circuitry 620 forms at least a part of the clock generation circuitry 134 of FIG. 1A. In one example, the clock correction circuitry 610 functions similar to the clock correction circuitry 210 of FIG. 2 and/or the clock correction circuitry 430 of FIG. 4. The divider circuitry 620 functions similar to the divider circuitry 220 of FIG. 2 and/or the divider circuitry 440 of FIG. 4. The detection circuitry 630 functions similar to the detection circuitry 230 of FIG. 2 and/or the detection circuitry 420 of FIG. 4.

In the example of FIG. 6, ADC circuitry is not available. For example, the CDR circuitry 600 of FIG. 6 may be used within transmitter circuitry (e.g. transmitter circuitry 110 of FIG. 1A). The clock correction circuitry 610 receives the clock signals Cki_p and Cki_n. Further, the clock correction circuitry 610 receives correction values 635 and 637 from the detection circuitry 630. The clock correction circuitry 610 generates the clock signals Cki_p' and Cki_n' based on the clock signals Cki_p and Cki_n and the correction values 635 and 637. The clock correction circuitry 610 functions as is described above with regard to the clock correction circuitry 210 of FIG. 2 and/or the clock correction circuitry 430 of FIG. 4 to generate the adjusted clock signals Cki_p' and Cki_n'.

The divider circuitry 620 generates the clock signal Cki from the clock signals Cki_p' and Cki_n'. The divider circuitry 620 functions as described above with regard to the divider circuitry 220 of FIG. 2 and/or the divider circuitry 440 of FIG. 4 to generate the clock signal Cki.

The detection circuitry 630 receives the clock signal Cki and generates the correction values 635 and 637 from the clock signal Cki. In one example, the clock signal Cki is delayed, and the clock signal Cki is compared with the delayed clock signal Cki to determine the correction values 635 and 637. In one example, the detection circuitry includes rising edge detection circuitry $632_1$ and falling edge detection circuitry $632_2$. The rising edge detection circuitry $632_1$ includes delay circuitry 644, flip-flop 640 and comparison circuitry 642. The delay circuitry 644 receives and applies a programmable delay (Td) to the clock signal Cki to generate the delayed clock signal Ckid. The programmable delay of the delay circuitry 644 is set by the rising edge correction circuitry 634. The clock signal Cki is received at the data input of the flip-flop 640 and the delayed clock signal Cki is received at the clock input of the flip-flop 640. The flip-flop 640 is a D-flip-flop. The output of the flip-flop 640 is connected to an input of the comparison circuitry 642. In one example, the flip-flop 640 and the comparison circuitry 642 function as a bang-bang phase detector (BBPD). The flip-flop 640 and the comparison circuitry 642 perform a phase comparison for two consecutive clock edges of the clock signals Cki and Ckid, and generate the output signal $643_1$. The output signal $643_1$ is a two bit signal. The output signal $643_1$ can be represented as (e1, e2). The state (e.g., values) of e1 and e2 are used by the rising edge correction circuitry 634 to determine the programmable delay for the delay circuitry 644 and/or the correction value 635.

Figure 7:
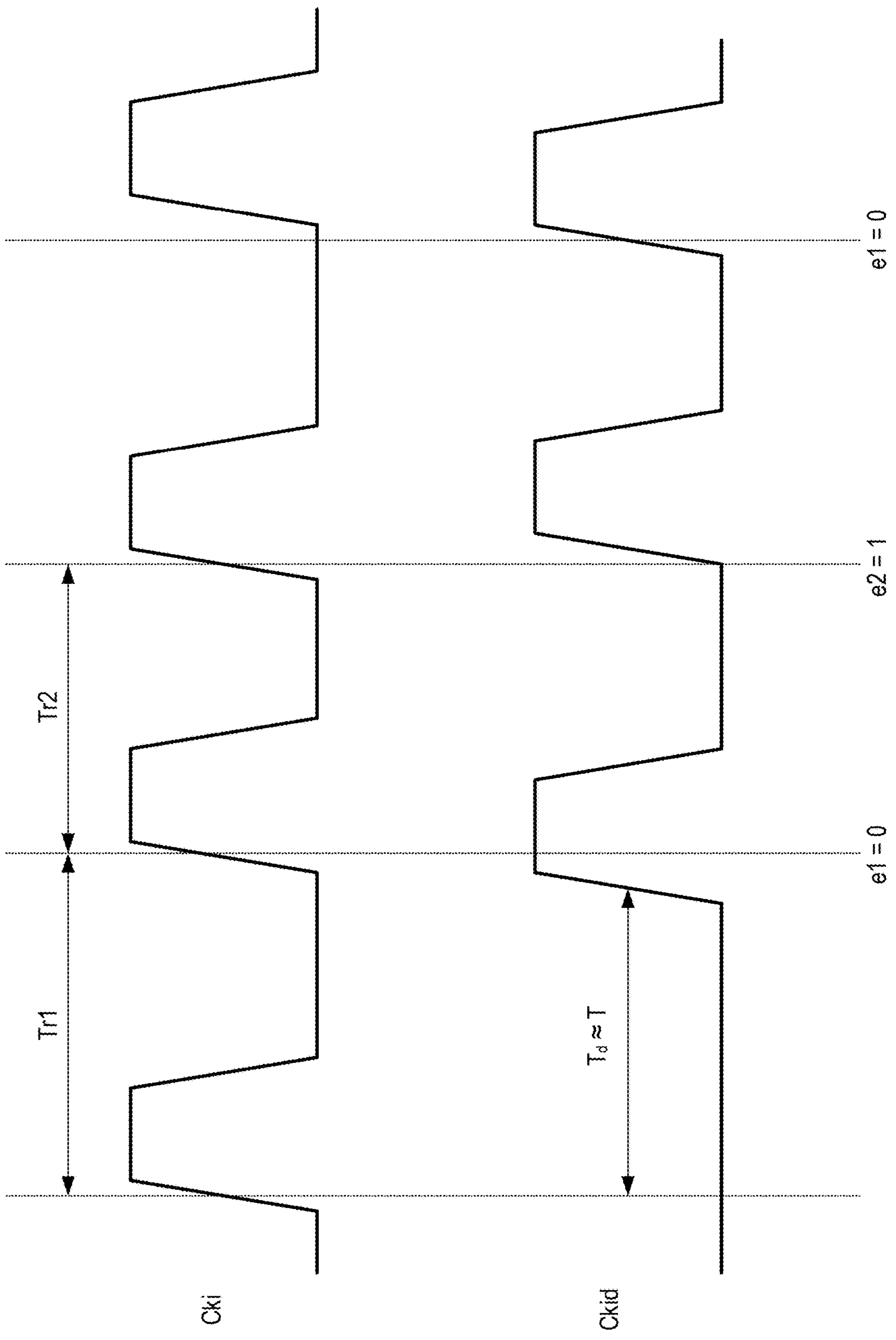
FIG. 7 illustrates waveforms of a divided clock signal and a delayed divided clock signal used for jitter detection.

The state of e1 and e2 is determined based on Tr1 and Tr2 as illustrated in FIG. 7 by the comparison circuitry 642. Tr1 and Tr2 are described in greater detail with regard to FIG. 2 and FIG. 3. In one example, when Td is greater than Tr1 and Tr2, the state of e1 is 1 and the state of e2 is 2. When Td is less than Tr1 and Tr2, the state of e1 is 0 and e2 is 0. When e1, e2 has a value of 1,1 or 0,0, Td is adjusted (increased or decreased). Td is adjusted until Td is determined to be equal to Tr1 and Tr2. In one or more examples, when the value of Td is too small, e1 and e2 both have a value of 0. Accordingly, Td is increased. When e1 and e2 both have a value of 1, Td is decreased.

In one example, the rising edge correction circuitry 634 receives the signal $643_1$. The rising edge correction circuitry 634 determines the states of e1 and e2 from the signal $643_1$ and determines the programmable delay Td is to be increased, decreased, or not adjusted based on the values of e1 and e2 as described above.

The state of e1 and e2 is further used to determine the correction value 635. For example, the rising edge correction circuitry 634 receives the signal $643_1$. The rising edge correction circuitry 634 determines the states of e1 and e2 from the signal $643_1$ and determines the correction value 635 based on the values of e1 and e2. For example, the comparison circuitry 642 determines the value of Tr1−Tr2, and if the value of Tr1−Tr2 is greater than 0, the state of e1, e2 is determined to be 0,1. Further, if the value of Tr1−Tr2 is less than 0, the state of e1, e2 is determined to be 1,0.

In one or more examples, the clock signal Cki_p is used to generate a first divider output (e.g., the clock signal Cki) of period Tr1. When e1=0 and e2=1, Tr1 is greater than Tr2. To reduce Tr1, the rise time of Cki_p is increased or the rise time of Cki_n is decreased. In one or more examples, the rise time of Cki_p is increased and the error of Tr1−Tr2 is determined to see if the error is increasing or decreasing. For an increasing error (e.g., an increasing difference between Tr1 and Tr2), the rise time of the clock signal Cki_p is increased (or the polarity is switched). For a decreasing error (e.g., a decreasing difference between Tr1 and Tr2), the rise time of the clock signal Cki_p is decreased or the rise time of the clock signal Cki_n is increased.

In one example, the programmable delay Td and the correction value 635 may be simultaneously determined. Further, when Tr1=Tr2=Td, adjustments the programmable delay Td and the clock signals Cki_p and Cki_n converge such that additional changes are not applied.

The falling edge detection circuitry $632_2$ is configured similar to the rising edge detection circuitry 6321. For example, the falling edge detection circuitry $632_2$ includes delay circuitry 644, flip-flop 640, and comparison circuitry 642. The falling edge detection circuitry $632_2$ receives the complementary clock signal Cki_cm generated by the inverter circuitry 638 from the clock signal Cki. The complementary clock signal Cki_cm is complementary in phase to the clock signal Cki. The falling edge detection circuitry 6322 functions as is described above with regard to the rising edge detection circuitry $632_1$ to compare consecutive falling edges of the complementary clock signal Cki_cm and the delayed complementary clock signal Cki_cmd to generate the output signal $643_2$. The output signal 6432 includes values e1, e2, which are determined from Td, Tf1 and Tf2, which are described in greater detail above with regard to FIGS. 2 and 3. Td, Tf1, and Tf2 are determined from the complementary clock signal Cki_cm and the delayed complementary clock signal Cki_cmd.

In one example, when Td is greater than Tf1 and Tf2, the state of e1 is 1 and the state of e2 is 2. When Td is less than Tf1 and Tf2, the state of e1 is 0 and e2 is 0. When e1, e2 has a value of 1,1 or 0,0, Td is adjusted (increased or decreased). Td is adjusted until Td is determined to be equal to Tf1 and Tf2.

In one example, the correction circuitry 636 receives the signal $643_2$. The correction circuitry 636 determines the states of e1 and e2 from the signal $643_2$ and determines that the programmable delay Td is to be increased, decreased, or not adjusted based on the values of e1 and e2 as described above.

The state of e1 and e2 is further used to determine the correction value 637. For example, the correction circuitry 636 receives the signal $643_2$. The correction circuitry 636 determines the states of e1 and e2 from the signal $643_2$ and determines the correction value 637 based on the values of e1 and e2. For example, the value of Tf1−Tf2 is determined, and if the value of Tf1−Tf2 is greater than 0, the state of e1, e2 is determined to be 0,1. Further, if the value of Tf1−Tf2 is less than 0, the state of e1, e2 is determined to be 1,0.

In one example, the programmable delay Td and the correction value 637 may be simultaneously determined. Further, when Tf1=Tf2=Td, adjustments the programmable delay Td and the clock signals Cki_p and Cki_n converge such that additional changes are not applied.

Figure 8:
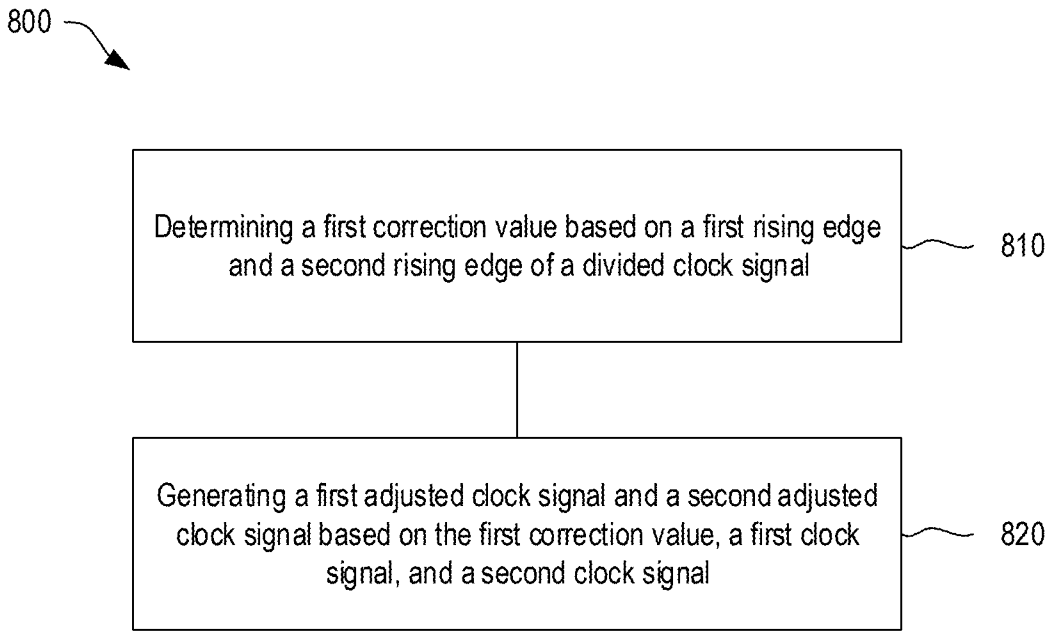
FIG. 8 illustrates a flowchart of a method for detecting and mitigating errors within a divided clock signal.

FIG. 8 illustrates a flowchart of a method 800 for operating a detecting and mitigating errors in clock signal. The method 800 is performed by correction circuitry (e.g., the correction circuitry 132 of FIG. 1A).

At 810 of the method 800, a first correction value is determined based on a first rising edge and a second rising edge of a divided clock signal. In one example, determining the first correction value is performed by the detection circuitry 230 of FIG. 2, the detection circuitry 420 of FIG. 4, and/or the detection circuitry 630 of FIG. 6. In one example, determining the first correction value includes determining a second correction value. The first and/or second corrections values are determined as described in greater detail in the above with regard to FIGS. 2-7.

At 820 of the method 800, a first adjusted clock signal and a second adjusted clock signal are determined based on the first correction value, a first clock signal, and a second clock signal. In one example, determining the first adjusted clock signal and the second adjusted clock signal is performed by the clock correction circuitry 210 of FIG. 2, the detection circuitry 420 of FIG. 4, and/or the detection circuitry 630 of FIG. 6. The first and/or second adjusted clock signals are determined as described in greater detail in the above with regard to FIGS. 2-7.

While the foregoing is directed to specific examples, other and further examples may be devised without departing from the basic scope thereof, and the scope thereof is determined by the claims that follow.

What is claimed is:

1. A correction circuitry comprising:

detection circuitry configured to determine a first correction value based on a first rising edge and a second rising edge of a divided clock signal output by divider circuitry; and clock correction circuitry configured to receive a first clock signal, a second clock signal and the first correction value, and generate a first adjusted clock signal and a second adjusted clock signal based on the first correction value, the first clock signal and the second clock signal, wherein the first adjusted clock signal and the second adjusted clock signal are used by the divider circuitry to generate an updated divided clock signal, and wherein a frequency of the updated divided clock signal is less than a frequency of the first clock signal and the second clock signal.

2. The correction circuitry of claim 1, wherein the detection circuitry is further configured to determine a second correction value based on the first rising edge and the second rising edge.

3. The correction circuitry of claim 2, wherein the first correction value corresponds to skew between the first clock signal and the second clock signal, and the second correction value corresponds to a difference in duty cycle between the first clock signal and the second clock signal.

4. The correction circuitry of claim 2, wherein the first correction value and the second correction value are further determined based on a third rising edge, a first falling edge, a second falling edge, and a third falling edge of the divided clock signal.

5. The correction circuitry of claim 4, wherein determining the first correction value comprises determining a first period between the first rising edge and the second rising edge, a second period between the second rising edge and the third rising edge, and determining a difference between the first period and the second period.

6. The correction circuitry of claim 5, wherein determining the second correction value comprises determining a third period between the first falling edge and the second falling edge, a fourth period between the second falling edge and the third falling edge, and determining a difference between the third period and the fourth period.

7. The correction circuitry of claim 1, wherein determining the first correction value based on the first rising edge and the second rising edge of the divided clock signal comprises:

receiving digital samples generated from an input signal and multi-phase clock signals generated from the divided clock signal; and comparing two consecutive samples to determine the first correction value.

8. The correction circuitry of claim 1, wherein determining the first correction value based on the first rising edge and the second rising edge of the divided clock signal comprises:

delaying the divided clock signal, and comparing a rising edge of the divided clock signal with a rising edge of the delayed divided clock signal.

9. A method comprising:

determining a first correction value based on a first rising edge and a second rising edge of a divided clock signal output by divider circuitry; and generating a first adjusted clock signal and a second adjusted clock signal based on the first correction value, a first clock signal, and a second clock signal, wherein the first adjusted clock signal and the second adjusted clock signal are used by the divider circuitry to generate an updated divided clock signal, and wherein a frequency of the updated divided clock signal is less than a frequency of the first clock signal and the second clock signal.

10. The method of claim 9 further comprising determining a second correction value based on the first rising edge and the second rising edge.

11. The method of claim 10, wherein the first correction value corresponds to skew between the first clock signal and the second clock signal, and the second correction value corresponds to a difference in duty cycle between the first clock signal and the second clock signal.

12. The method of claim 10, wherein the first correction value and the second correction value are further determined based on a third rising edge, a first falling edge, a second falling edge, and a third falling edge of the divided clock signal.

13. The method of claim 12, wherein determining the first correction value comprises determining a first period between the first rising edge and the second rising edge, a second period between the second rising edge and the third rising edge, and determining a difference between the first period and the second period.

14. The method of claim 13, wherein determining the second correction value comprises determining a third period between the first falling edge and the second falling edge, a fourth period between the second falling edge and the third falling edge, and determining a difference between the third period and the fourth period.

15. The method of claim 9, wherein determining the first correction value based on the first rising edge and the second rising edge of the divided clock signal comprises:

receiving digital samples generated from an input signal and multi-phase clock signals generated from the divided clock signal; and comparing two consecutive samples to determine the first correction value.

16. The method of claim 9, wherein determining the first correction value based on the first rising edge and the second rising edge of the divided clock signal comprises:

delaying the divided clock signal, and comparing a rising edge of the divided clock signal with a rising edge of the delayed divided clock signal.

17. A communication system comprising:

transceiver circuitry connecting a first integrated circuit (IC) device with a second IC device, the transceiver circuitry comprising:

detection circuitry configured to determine a first correction value based on a first rising edge and a second rising edge of a divided clock signal;

clock correction circuitry configured to receive a first clock signal, a second clock signal and the first correction value, and generate a first adjusted clock signal and a second adjusted clock signal based on the first correction value, the first clock signal and the second clock signal; and clock divider circuitry configured to generate an updated divided clock signal from the first adjusted clock signal and the second adjusted clock signal, wherein a frequency of the updated divided clock signal is less than a frequency of the first clock signal and the second clock signal.

18. The communication system of claim 17, wherein the detection circuitry is further configured to determine a second correction value based on the first rising edge and the second rising edge.

19. The communication system of claim 18, wherein the first correction value and the second correction value are further determined based on a third rising edge, a first falling edge, a second falling edge, and a third falling edge of the divided clock signal.

20. The communication system of claim 19, wherein determining the first correction value comprises determining a first period between the first rising edge and the second rising edge, a second period between the second rising edge and the third rising edge, and determining a difference between the first period and the second period, and wherein determining the second correction value comprises determining a third period between the first falling edge and the second falling edge, a fourth period between the second falling edge and the third falling edge, and determining a difference between the third period and the fourth period.

* * * * *